Nov. 21, 1967    J. W. BRUNES    3,353,629
PACK FRAME AND TREE SEAT STRUCTURE
Filed Aug. 10, 1966    2 Sheets-Sheet 1

INVENTOR.
JAMES W. BRUNES
BY
Williamson, Palmatier + Bains
ATTORNEYS

Nov. 21, 1967   J. W. BRUNES   3,353,629
PACK FRAME AND TREE SEAT STRUCTURE
Filed Aug. 10, 1966   2 Sheets-Sheet 2

INVENTOR.
JAMES W. BRUNES
BY
Williamson, Palmatier + Bains
ATTORNEYS

United States Patent Office 3,353,629
Patented Nov. 21, 1967

3,353,629
PACK FRAME AND TREE SEAT STRUCTURE
James W. Brunes, Pequot Lakes, Minn. 56472
Filed Aug. 10, 1966, Ser. No. 571,460
7 Claims. (Cl. 182—20)

This invention relates to a pack frame and tree seat structure and, more particularly, relates to a pack frame which is readily interchanged between a pack frame and tree seat or tree stand to be used by a hunter.

Hunters, particularly those who hunt deer and the like, often times spend a great deal of time in the woods and desire to travel as light as possible. Further, in hunting in the woods, the hunter wishes to have his rifle ready for quick use at all times. When hunting deer, it is typical to sit or stand in one place for several hours. In that hunting is often times done in the late fall or winter, sitting on the ground is generally uncomfortable and may be unsafe. Many times a deer hunter wishes to elevate himself well above the ground to view a larger area if the local hunting laws permit.

For a hunter to properly outfit himself for a hunting trip and still maintain a degree of mobility is a major undertaking. The hunter must carry in food, binoculars, rope, shells and other items. If the hunter wishes to sit or provide a tree stand, he must bring means to do so into the woods on the hunting trip.

Of the devices presently on the market, most do not convert from use as a knap sack or other shoulder-receiving pack to a tree seat or tree stand. Of the convertible, knap sack and tree seat devices, many are not readily interchangeable from one use to the other and others, which may be affixed to a tree, are not conveniently and quickly attached to a tree and, generally, create a great deal of noise during the conversion and attachment procedure thereby scaring the nearby game.

With these comments in mind, it is to the elimination of these and other disadvantages to which the present invention is directed, along with the inclusion therein of other novel and desirable features.

An object of my invention is to provide a new and improved pack frame and tree seat structure of simple and inexpensive construction and operation.

Another object of my invention is to provide a novel pack frame and tree seat structure which quickly converts from a pack frame to a tree seat.

Still another object of my invention is the provision of an improved and novel pack frame and tree seat structure with the interchangeable tree seat adapted to be attached to a tree or other like upright object with a maximum of ease, a minimum of noise and a maximum of stability.

A further object of my invention is the provision of a pack frame and tree stand structure which is virtually noiseless in its use and which may be adjusted, when in the pack frame assembly, to suit any size user and, when in the tree stand assembly, to suit any size tree.

A still further object of my invention is the provision of a combined pack frame and tree stand structure which includes a knap sack sufficiently large to carry items needed by a hunter during a hunting trip and to store the items in such a way that the items are readily accessible even when the structure is utilized as a tree stand.

These and other objects and advantages of my invention will more fully appear from the following description made in connection with the accompanying drawings wherein like reference characters refer to the same or similar parts throughout the several views, and in which.

Figure 1:
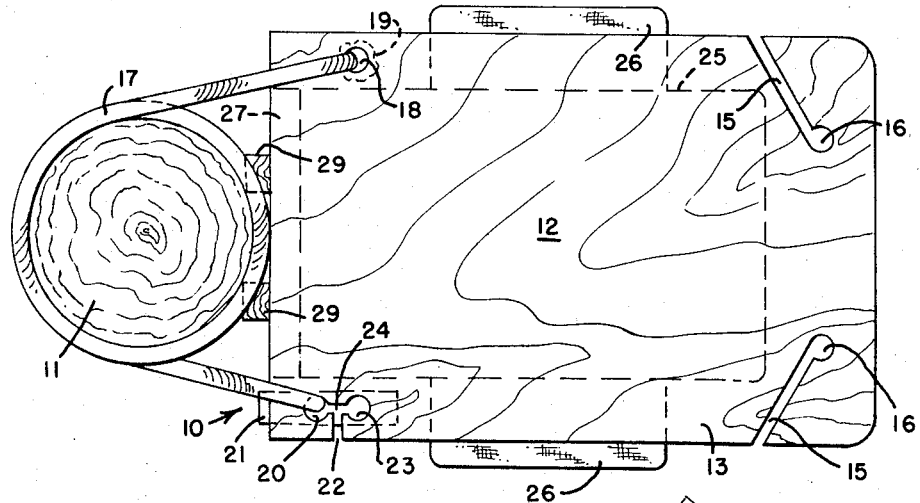
FIG. 1 is a plan view of my pack frame and tree stand structure as it would appear in the tree stand assembly attached to a tree.

One form of the present invention is shown in the drawings and is described herein. The pack frame and tree stand structure of my invention is shown in FIG. 1 and is indicated, in general, by numeral 10. My device is shown in the tree stand assembly and attached to tree 11. My combined pack frame and tree stand structure comprises a back-engaging member 12 having a front side, not shown in the plan view, and a back side 13 which, in the tree stand assembly, forms the seat or stand. A pair of elongate notches 15 is included at the outer portion of back-engaging member 12 and communicates with rope-receiving apertures 16 to permit threading of aperture 16 with a rope without the need for disassembling a rope in that the rope is slidable through elongate notches 15. A rope 17 is attached to back-engaging member 12 and is shown inserted through aperture 18 in back-engaging member 12 with the rope 17 knotted, as at 19, adjacent the forward side of back-engaging member 12. Rope 17 is shown wound about tree 11 with the other end of the rope threaded through aperture 20 at the rear portion of the back-engaging member 12 and securely attached to adjusting block 21. Notch 22 communicates with rope-receiving aperture 20 to permit rope 17 to be slidably moved through aperture or slot 22 into aperture 20. Slot or notch 22 further communicates with aperture 23 which in turn communicates with aperture 20, to permit rope 17 to be slidably moved either from the outside through notch 22 to aperture 23, or from aperture 20 to aperture 23 through the communicating slot 24 between apertures 20 and 23 respectively. Rope 17 may be positioned in aperture 23 at such time as the rope 17 may be utilized as a shoulder-carrying rope. A knap sack 25 is attached to the front side of the back-engaging member 12. Knap sack side pockets 26 are attached to the knap sack 25 at each side. A depending tree-engaging member 27 is attached to back-engaging member 12, for example, utilizing screws which are not shown. A pair of stabilizers 29 is attached to tree-engaging member 27 and is adapted to be positioned alongside tree 11 and at each side thereof cradling a portion of the tree therebetween. The stabilizers 29 tend to stabilize the tree stand in that rotation about a vertical axis is generally prohibited by the stabilizers. Stabilizers 29 may be attached to tree-engaging member 27 utilizing screws, which are not shown.

Figure 2:
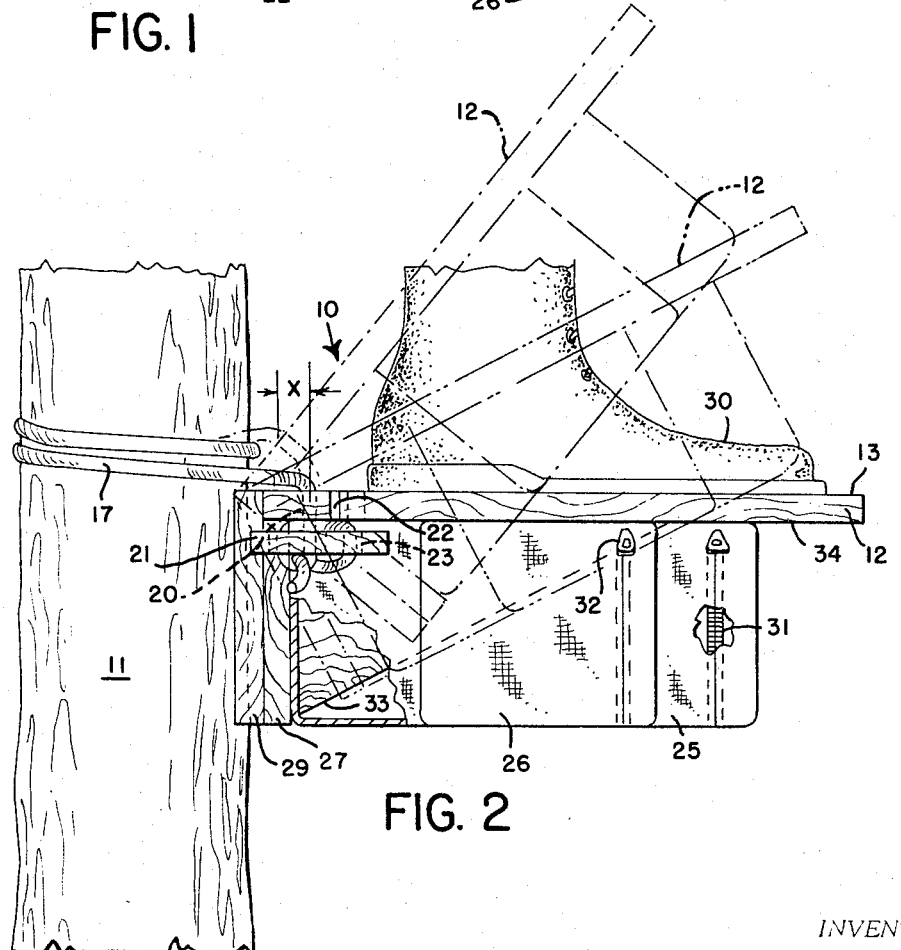
FIG. 2 is a side elevation of my device in the tree stand assembly attached to a tree with the steps of attachment shown in dotted lines and shown with portions broken away for clarity.

Back-engaging member 12, tree-engaging member 27 and stabilizers 29 are constructed from wood and may be screwed or glued together. Slots 15 and 22 and the apertures 16, 18, 20 and 23 and slot 24 may be sawed or drilled into the back-engaging member 12. Of course, the entire structure may be molded from, for example, reinforced fiber glass thereby eliminating any operations such as those outlined above. Rope 17 may be nylon in that the nylon rope is light and strong. Of course, other ropes may be used. Knap sack 25 may be constructed from a vinyl material and attached to back-engaging member 12 by gluing or otherwise attaching thereto. Of course, any convenient divisions for knap sack 25 may be utilized with, for example, a separate pocket for ammunition, a separate pocket for sandwiches and the like and a large pocket for such heavy items as knives, rope and other items important to a hunter during an outing. Referring to FIG. 2, further detail of my pack frame and tree stand structure is shown. The device is shown attached to tree 11 and schematically shows a man standing on back surface 13 of back-engaging member 12. A shoe 30, schematically indicating the man standing on the platform, is shown. Rope 17 tightly encircles tree 11 and is shown passing through aperture 20 into adjusting block 21 forming a tight connection with block 21 pulled securely against back-engaging member 12, thereby firmly supporting the wearer of shoe 30. Upright stabilizers 29 engage the tree cradling it therebetween to prevent rotation of the platform upon which the hunter is standing, thereby allowing the hunter to stand on the platform for a long period of time without experiencing fatigue which would be generated by a sloping platform 13 or a twisting or turning platform from improper engagement of the platform at the tree. Rope 17 is shown having been passed through slot 22 and located in aperture 20. Alternate aperture 23 is also shown.

Knap sack 25 is shown with side pocket 26 attached thereto. It should be noted that zipper 31, as well as zipper 32, opens its respective knap sack compartment for easy access to the compartment when the structure is used as a tree stand. Further, the knap sack compartments are opened in such a way that the contents maintained therein are not disturbed or spilled during the opening process. In the interest of eliminating noise in the woods, zippers 31 and 32 may be constructed from nylon or other similar materials. Of course, a metal zipper may be used as well as other closure means, with particular emphasis on closure means which are actuated with a minimum of noise. As shown in the breakaway of FIG. 2, reinforcing member 33 is shown and takes the form of a triangularly-shaped gusset with one leg adjacent the tree-engaging member (or element) 27 and the front surface 34 of back-engaging member 12. Supports or braces 33 are constructed of wood and may be attached to the back-engaging member 12 or the tree-engaging member 27, for example, utilizing screws. Typically, a pair of braces 33 may be used and is placed within the knap sack 25 at each side to afford maximum bracing. However, it is entirely possible to include the gussets or braces 33 in the overall mold when constructing the pack frame from a reinforced fiber glass or plastic material. In this instance, of course, the knap sack would be slotted along the rear portion when it is attached to back-engaging member 12 to receive within the knap sack the gussets or braces 33. It may also be desirable, in some instances, to arrange the knap sack 25 in such a way that the front surface 34 of back-engaging member 12 forms the back surface of the knap sack with the sides of the knap sack only attached to the surface 34 of back-engaging member 12.

Figure 3:
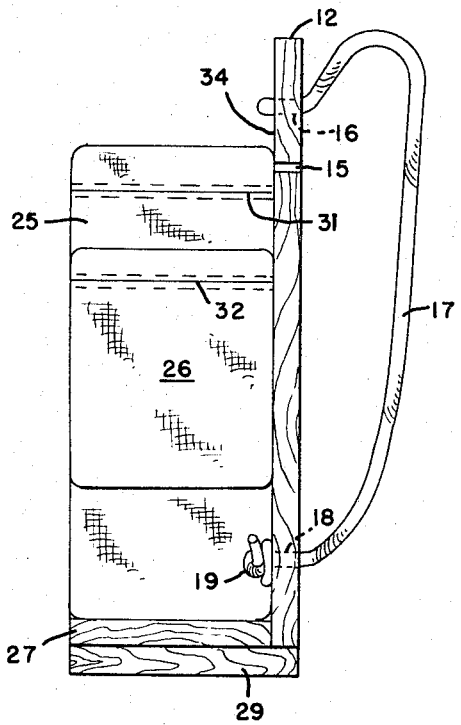
FIG. 3 is a side view of my pack frame and tree stand structure showing my device in the pack frame assembly.

As shown in FIG. 3, my pack frame and tree stand structure is assembled in the pack frame form. Rope 17 is removed from the tree and beginning with knot 19 is threaded through aperture 18, then through slot 15 into aperture 16, across the front portion 34 of back-engaging member 12 into the corresponding aperture 16 with the second loop formed by attaching the block 21 into aperture 23, which is not shown in FIG. 3. Knap sack zipper 31 is shown as is zipper 32 for side container 26.

Figure 4:
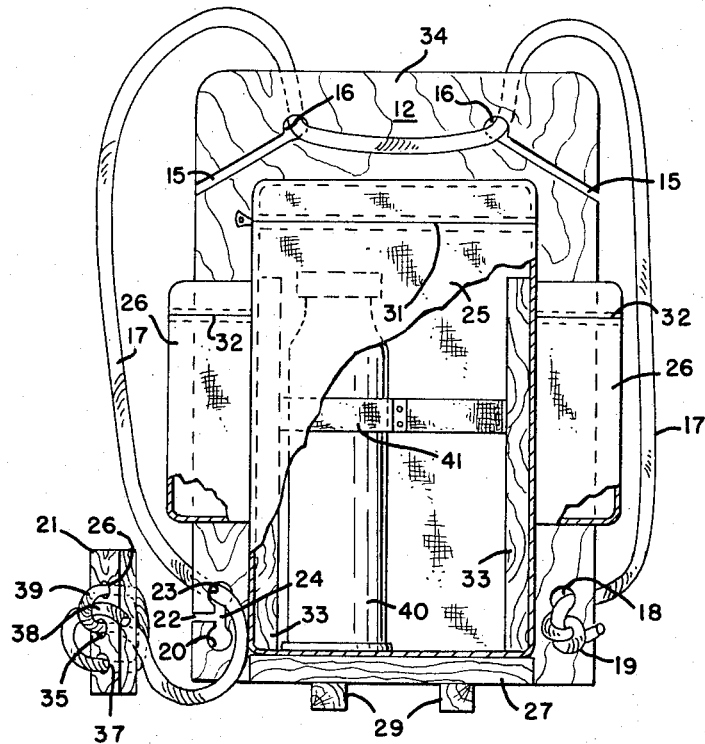
FIG. 4 is a rear view of my pack frame and tree stand structure shown in the pack frame assembly with portions broken away for clarity.

FIG. 4 shows the construction of the shoulder harness when my structure takes the pack frame form. Knot 19 is shown with the rope 17 threaded through aperture 18, then through slot 15 and positioning the rope in aperture 16 with the rope proceeding across the front surface 34 of back-engaging member 12 and through the corresponding aperture 16 on the other side of the back-engaging member 12 utilizing slot 15. Rope 17 is then inserted into slot 22 with the rope 17 engaging aperture 23 and block 21 being pulled adjacent the front surface 34 of back-engaging member 12. It should be noted that aperture 20 is utilized in the tree stand form of my structure but is not utilized in the pack frame form of my structure. However, notch 24 may be utilized to join aperture 23 with aperture 20. Note that adjusting block 21 includes three openings to receive rope 17. Rope 17 is first passed through the middle aperture or opening 35 and then downwardly through side opening 36 and upwardly through the second side opening 37. The end portion 38 of rope 17 is then placed under loop 39 which is formed from the portion of the rope above apertures 35 and 36, respectively. As rope 17 is tightened, either as a shoulder harness or as a tree-engaging rope, the loop 39 is placed under tension and sandwiches the end portion 38 between loop 39 and adjusting block 21. Therefore, as more tension is placed on the rope, the vise-like action of the knot and construction of the adjusting block further tightens the grip or knot thereby preventing slippage. The breakage view shows braces or supports 33 disposed within the knap sack 25. A vacuum bottle 40 is shown with bottle-holding strap 41 securely maintaining the bottle in position. Of course, other means may be used for mounting such things as vacuum bottles within the knap sack.

The operation of my pack frame and tree seat structure is best seen by reference to FIG. 2. In attaching my pack frame to a tree to be used as a tree seat, the device assumes a position approximately as shown in the dotted lines of FIG. 2. Back engaging member 12 is disposed against tree 11 in an upward position, the position which the structure would take when utilized as a pack frame. Rope 17 is wrapped about tree 11 and snugly tightened utilizing block 21. Next, the pack frame is pulled downwardly, as indicated by the dotted lines, thereby tightening rope 17 about tree 11. As indicated by dimension *x*, the apertures 18 and 20 which receive rope 17 are close to tree 11 as the pack frame back engaging member 12 is disposed upright. As the back engaging member 12 is pushed downwardly by the operator, apertures 18 and 20 are rotated outwardly, away from tree 11. The increased distance from tree 11 of apertures 18 and 20 is indicated by the dimension *x* and therefore rope 17 is tightened by this amount. This snugly engages the pack frame about the tree for use, in the solid line position, as a tree seat or stand. Stabilizers 29 tightly cradle tree 11 therein, thereby preventing any sway or other rotational movement of the tree seat or tree stand.

To convert the tree seat to the pack frame, the pack engaging member 12 is simply urged upwardly into the position shown in the dotted lines, thereby bringing apertures 18 and 20 closer to tree 11 and decreasing dimension *x*. This, therefore, loosens rope 17 which may then be released from tree 11 by slipping rope 17 out of aperture 20 through notch 22. Rope 17 is then slid through the pair of notches 15 and into aperture 16 with the block 21 disposed with the attached rope slid through notch 22 and inserted in aperture 23. This forms a harness allowing the user to mount the pack frame on his back. This operation may be conducted in the coldest weather with heavy mittens in that threading of the rope through the apertures is not necessary. Of course, it should be understood that apertures without notches may be used thereby requiring the operator to thread the rope 17 through the openings rather than slide the rope through notches to the openings.

It will, of course, be understood that various changes may be made in the form, details, arrangement and proportions of the various parts without departing from the scope of my invention.

What is claimed is:

1. A pack frame and tree seat structure adapted to be used interchangeably as a pack frame and tree seat, said structure comprising a substantially rigid back-engaging member having a front and back surface, said back-engaging member having a plurality of apertures therein, a substantially rigid tree-engaging member affixed to said back-engaging member in substantially right angular relation, rope means affixed, at one end, to said back-engaging member at one of the apertures therein, said rope means adapted to be used interchangeably as means attaching said pack frame and tree seat structure to the back of an operator and to an upright tree or the like, a knap sack attached to the front surface of said back-engaging member and means adjusting the tension of said rope means.

2. The pack frame and tree seat structure of claim 1 wherein said back-engaging member includes a plurality of apertures therein having notches communicating therewith whereby said rope means is adapted to be inserted into the apertures in said back-engaging member through the notches in said back-engaging member.

3. The structure of claim 1 wherein a pair of upright stabilizers is attached to said tree-engaging member in spaced parallel relation to permit cradling of a tree therebetween, said stabilizers thereby stabilizing said structure in the tree seat form preventing rotation about a substantially vertical axis.

4. The structure of claim 1 including at least one reinforcing member affixed to said back-engaging member at the front surface thereof and to the tree-engaging member whereby the right angular relation of said back-engaging member to said tree-engaging member is maintained.

5. The pack frame and tree seat structure of claim 1 wherein said knap sack includes at least one side pocket and wherein said knap sack includes loop means adapted to receive a vacuum bottle or the like therein.

6. The pack frame and tree seat structure of claim 1 wherein said back-engaging member and said tree-engaging member are of integral construction.

7. The structure of claim 6 including a pair of upright stabilizers spaced apart a predetermined distance and integral with said tree-engaging member and including a pair of reinforcing members integral with said back-engaging member and said tree-engaging member whereby the right angular relation of said members is maintained.

References Cited
UNITED STATES PATENTS

| | | | |
|---|---|---|---|
| 2,394,203 | 2/1946 | Pruder | 182—187 |
| 2,991,842 | 7/1961 | Hardin | 182—187 |
| 3,006,433 | 10/1961 | Farver | 182—187 |

REINALDO P. MACHADO, *Primary Examiner.*